United States Patent
Hsu

(10) Patent No.: US 9,700,116 B2
(45) Date of Patent: Jul. 11, 2017

(54) LOOP-SHAPED HAIR HOLDING DEVICE

(71) Applicant: Shih Ling Hsu, Tainan (TW)

(72) Inventor: Shih Ling Hsu, Tainan (TW)

( * ) Notice: Subject to any disclaimer, the term of this patent is extended or adjusted under 35 U.S.C. 154(b) by 217 days.

(21) Appl. No.: 14/679,329

(22) Filed: Apr. 6, 2015

(65) Prior Publication Data

US 2016/0289441 A1    Oct. 6, 2016

(51) Int. Cl.
*A45D 33/00* (2006.01)
*A45D 8/34* (2006.01)
*C08L 9/00* (2006.01)

(52) U.S. Cl.
CPC . *A45D 8/34* (2013.01); *C08L 9/00* (2013.01)

(58) Field of Classification Search
CPC ........ C08L 47/00; C08L 9/00; C08L 2201/08; C08L 2205/02; C08L 2205/035; A45D 8/34

See application file for complete search history.

(56) References Cited

U.S. PATENT DOCUMENTS 5,216,074 A * 6/1993 Imai .................. C08C 19/02
524/504

* cited by examiner

*Primary Examiner* — Rachel Steitz

(57) ABSTRACT

A loop-shaped hair holding device is made from ingredients including 40 wt % of butadiene, 10 wt % of polyethylene, 3 wt % of polypropylene, 15 wt % of paraffin oil, 12 wt % of styrene, 15 wt % of silicone, 3 wt % of a stabilizer, and 2 wt % of a cross linking agent. The weight of each of the ingredients has a margin of error of 5%. The loop-shaped hair holding device has good surface unctuousness, good toughness, and high elasticity to avoid deformation.

1 Claim, 2 Drawing Sheets

LOOP-SHAPED HAIR HOLDING DEVICE

BACKGROUND OF THE INVENTION

The present invention relates to a loop-shaped hair holding device and, more particularly, to a loop-shaped hair holding device with improved surface unctuousness, toughness, and elasticity to avoid deformation.

A loop-shaped hair holding device can hold hair together to prevent straggling while shaping the hair. To provide a clamping force, the loop-shaped hair holding device is generally made of elastic plastic material, such that the loop-shaped hair holding device can hold the hair received therein by its elasticity. The material for the loop-shaped hair holding device mainly consists of butadiene, polyethylene, polypropylene, and paraffin oil that are polymerized. The product is elastic but has poor surface unctuousness, such that the hair is apt to tear along with the loop-shaped hair holding device while removing the loop-shaped hair holding device from the hair. Furthermore, the elasticity of the loop-shaped hair holding device degrades after stretching, such that the diameter of the loop-shaped hair holding device gradually increases, leading to greatly deformation after a period of time of use.

In an approach to solve the poor surface unctuousness of the loop-shaped hair holding device, the elastic plastic body is covered with an elastic band made of cloth to avoid sticking of hair, thereby preventing the hair from being torn while removing the loop-shaped hair holding device. However, the manufacturing costs are increased, and the elastic band made of cloth still deforms after a period of time of use.

BRIEF SUMMARY OF THE INVENTION

An objective of the present invention is to provide a loop-shaped hair holding device with improved surface unctuousness, toughness, and elasticity to avoid deformation while reducing surface stickiness.

A loop-shaped hair holding device according to the present invention is made from ingredients including 40 wt % of butadiene, 10 wt % of polyethylene, 3 wt % of polypropylene, 15 wt % of paraffin oil, 12 wt % of styrene, 15 wt % of silicone, 3 wt % of a stabilizer, and 2 wt % of a cross linking agent. The weight of each of the ingredients has a margin of error of 5%.

The loop-shaped hair holding device can have a Shore hardness of 25 A-30 A.

The surface of the product of the loop-shaped hair holding device according to the present invention has good unctuousness, good toughness, and high elasticity, such that when the loop-shaped hair holding device is being removed from the hair, the hair will not stick to the loop-shaped hair holding device and, thus, will not break. Furthermore, the loop-shaped hair holding device is less likely to deform when the loop-shaped hair holding device restores its shape after stretching, such that the loop-shaped hair holding device maintains the original shape after a long period of time of use. Furthermore, the loop-shaped hair holding device can reduce the influence by ozone, light, and heat and is less easily to oxide, deteriorate, and crack.

The present invention will become clearer in light of the following detailed description of illustrative embodiments of this invention described in connection with the drawings.

DETAILED DESCRIPTION OF THE INVENTION

Figure 1:
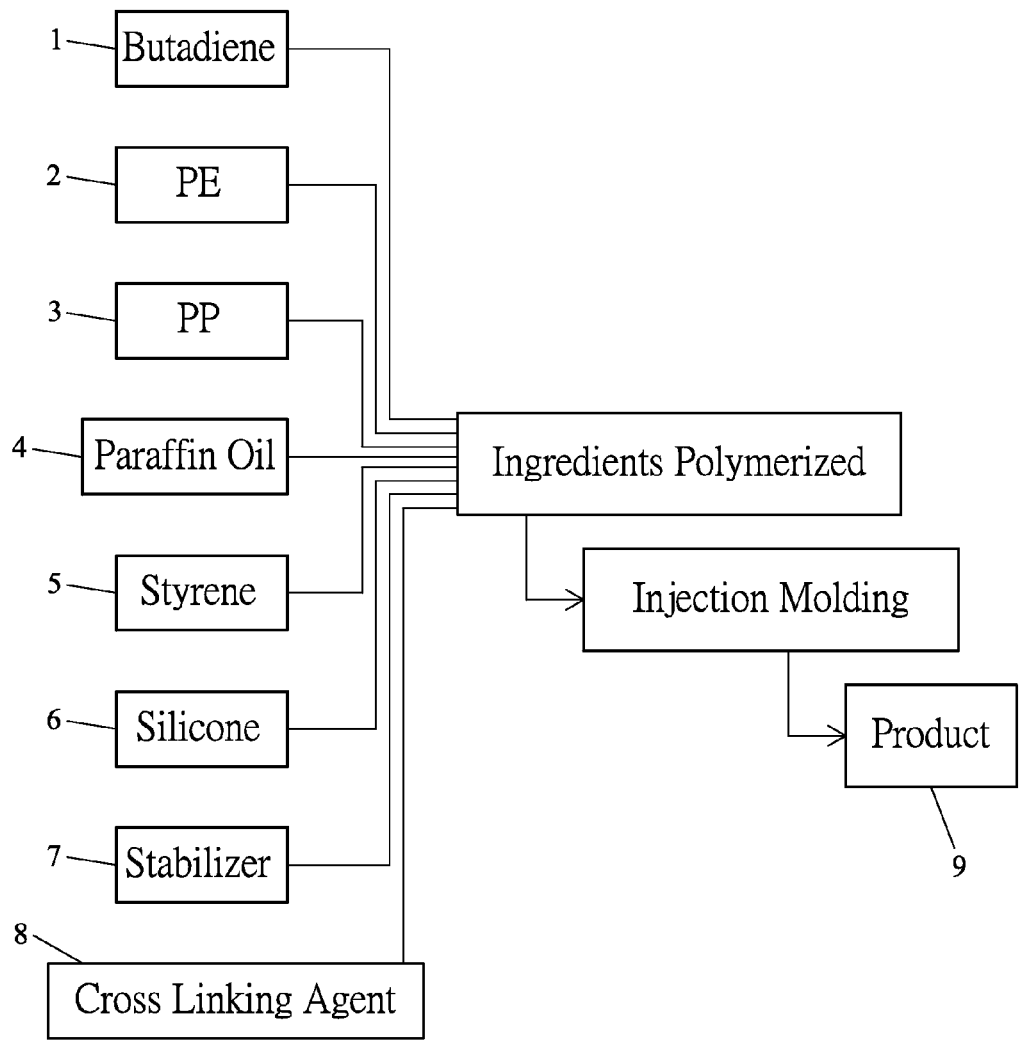
FIG. 1 is a block diagram illustrating a process for manufacturing a loop-shaped hair holding device according to the present invention.

With reference to FIG. 1, a loop-shaped hair holding device according to the present invention is made from ingredients including 40 wt % of butadiene (reference number 1), 10 wt % of polyethylene (PE, reference number 2), 3 wt % of polypropylene (PP, reference number 3), 15 wt % of paraffin oil (reference number 4), 12 wt % of styrene (reference number 5), 15 wt % of silicone (reference number 6), 3 wt % of a stabilizer (reference number 7), and 2 wt % of a cross linking agent (reference number 8). The ingredients 1-8 are polymerized and then placed into a mold for injection molding. A product 9 of the loop-shaped hair holding device is obtained after injection molding.

Figure 2:
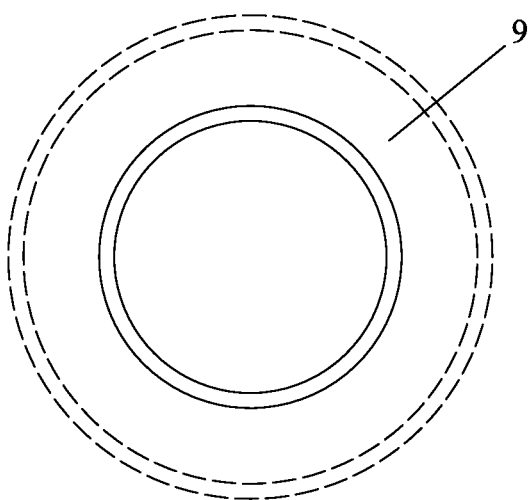
FIG. 2 is a diagrammatic view of the loop-shaped hair holding device according to the present invention.

The weight of each ingredient can have a margin of error of 5%. The percentages of the above ingredients were found to be the optical values. Preferably, the product 9 of the loop-shaped hair holding device has a Shore hardness of 25 A-30 A. As shown in FIG. 2, the product 9 of the loop-shaped hair holding device is elastic for holding hair (not shown). The surface of the product 9 has good unctuousness, such that when the loop-shaped hair holding device is being removed from the hair, the hair will not stick to the loop-shaped hair holding device and, thus, will not break. Furthermore, the product 9 has good toughness and high elasticity to maintain the original shape after a long period of time of use. Furthermore, the product 9 can reduce the influence by ozone, light, and heat and is less easily to oxide, deteriorate, and crack.

The loop-shaped hair holding device can have a non-circular shape. The product 9 of the loop-shaped hair holding device according to the present invention possesses surface unctuousness and high elasticity after shaping and is, thus, less likely to deform. The loop-shaped hair holding device provides better hair holding applicability than conventional products and significantly increases the utility.

Although specific embodiments have been illustrated and described, numerous modifications and variations are still possible without departing from the scope of the invention. The scope of the invention is limited by the accompanying claims.

The invention claimed is:

1. A loop-shaped hair holding device of a Shore hardness of 25 A-30A with an improved quality of unctuousness, toughness and elasticity in resistance to ozone, light, and heat, made from ingredients comprising 40 wt % of butadiene, 10 wt % of polyethylene, 3 wt % of polypropylene, 15 wt % of paraffin oil, 12 wt % of styrene, 15 wt % of silicone, 3 wt % of a stabilizer, and 2 wt % of a cross linking agent, wherein a weight of each of the ingredients has a margin of error of 5% such that when the device is removed from a person's hair, the hair does not stick to the device nor break, and the device is also less likely to deform after stretching or long-term use.

* * * * *